(12) United States Patent
Takita (10) Patent No.: US 8,848,927 B2
(45) Date of Patent: Sep. 30, 2014

(54) RECORDER THAT CREATES STEREOPHONIC SOUND

(75) Inventor: Mark Takita, Menlo, CA (US)

(73) Assignee: Nikon Corporation, Tokyo (JP)

( * ) Notice: Subject to any disclaimer, the term of this patent is extended or adjusted under 35 U.S.C. 154(b) by 1762 days.

(21) Appl. No.: 11/653,204

(22) Filed: Jan. 12, 2007

(65) Prior Publication Data

US 2008/0170705 A1  Jul. 17, 2008

(51) Int. Cl.
*H04R 5/00* (2006.01)
*H04N 5/77* (2006.01)
*H04N 5/232* (2006.01)
*H04S 7/00* (2006.01)
*H04N 9/82* (2006.01)
*H04S 5/00* (2006.01)

(52) U.S. Cl.
CPC ............ *H04N 5/23212* (2013.01); *H04N 5/772* (2013.01); *H04S 7/302* (2013.01); *H04N 9/8216* (2013.01); *H04S 5/00* (2013.01)
USPC .......................................................... 381/26

(58) Field of Classification Search
USPC .................................. 381/306; 348/515, 738
See application file for complete search history.

(56) References Cited

U.S. PATENT DOCUMENTS 6,829,018 B2 * 12/2004 Lin et al. ....................... 348/738
2005/0237395 A1 * 10/2005 Takenaka et al. .......... 348/231.4

OTHER PUBLICATIONS

The Nikon Guide to Digital Photography with the D2x Digital Camera by Nikon Corporation.

\* cited by examiner

*Primary Examiner* — Duc Nguyen
*Assistant Examiner* — Kile Blair
(74) *Attorney, Agent, or Firm* — Roeder & Broder LLP (57) ABSTRACT

A recorder (10) for recording a scene (12) includes an apparatus frame (218), an optical assembly (220), an image system (222), a position assembly (243), an audio system (224), and a compensation system (248). The image system (222) captures an image (252) of the scene (12). The position assembly (243) can be an autofocusing assembly (244) that focuses the optical assembly (220) on a subject (16) of the scene (12). The position assembly (243) generates position information relating to the position of the subject (16) relative to the recorder (10). The audio system (224) captures a captured sound from the scene (12). The compensation system (248) evaluates the position information and the captured sound from the scene (12) and provides an adjusted sound track in view of the position information.

20 Claims, 5 Drawing Sheets

RECORDER THAT CREATES STEREOPHONIC SOUND

BACKGROUND

Digital cameras are commonly used to capture an image of a scene. Certain digital cameras include a video mode in which the digital camera captures multiple images every second of the scene. Additionally, the digital camera can simultaneously capture sound from the scene. Unfortunately, to save cost and space, most digital cameras only include a single microphone for capturing sound. As a result thereof, during playback of the video, the audio signal is monaural.

SUMMARY

The present invention is directed to a recorder for recording a scene that includes a subject. In one embodiment, the recorder includes an apparatus frame, an optical assembly, an image system, a position assembly, an audio system, and a compensation system. The image system captures an image of the scene. The position assembly determines the position of the subject relative to the recorder and generates position information relating to the position of the subject relative to the recorder. The audio system captures a captured sound from the scene. The compensation system evaluates the position information and the captured sound from the scene and provides an adjusted sound track in view of the position information.

In one embodiment, the compensation system evaluates the position information to determine the position of the subject along at least one axis relative to the optical assembly, and the compensation system provides the adjusted sound track based on the position of the subject along the at least one axis. In another embodiment, the compensation system evaluates the position information to determine the position of the subject along at least two axes relative to the optical assembly, and the compensation system provides the adjusted sound track based on the position of the subject along the at least two axes. In yet another embodiment, the compensation system evaluates the position information to determine the position of the subject along three axes relative to the optical assembly, and the compensation system provides the adjusted sound track based on the position of the subject along the three axes.

With the present invention, for example, if the audio system captures the sound from the scene in a monaural fashion, with the position information, the compensation system can create an adjusted sound track that is stereophonic.

The present invention is also directed to a method for recording a scene and a method for providing a stereophonic adjusted sound track from a sound track that is monaural.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
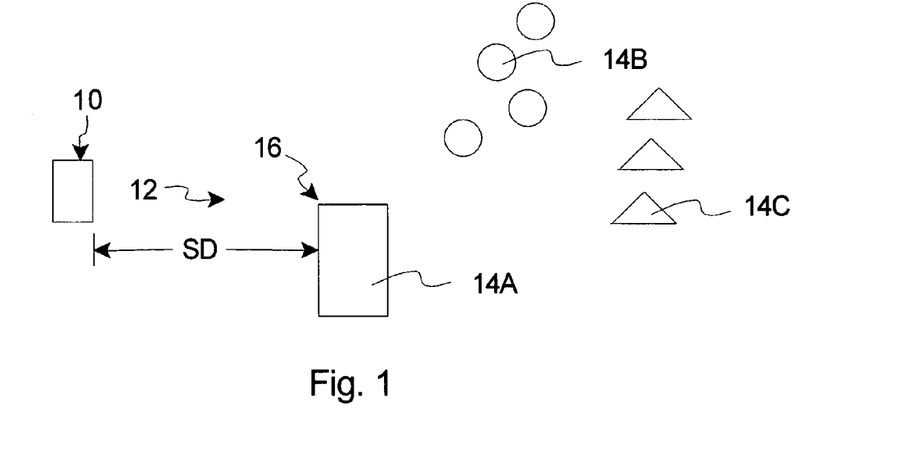
FIG. 1 is a simplified side plan illustration of a scene and a recorder having features of the present invention.

FIG. 1 is a simplified top plan illustration of a recorder 10 and a scene 12. The recorder 10 is useful for providing a video and audio reproduction of the scene 12. The type of scene 12 captured by the recorder 10 can vary. For example, each scene 12 can include one or more animals, plants, mammals, fish, objects, and/or environments. In FIG. 1, the scene 12 includes a single first object 14A (illustrated as a square), a plurality of second objects 14B (illustrated as circles), and a plurality of third objects 14C (illustrated as triangles). Alternatively, for example, the scene 12 can include more than three or less than three different objects 14A-14C, and/or the number of each of the objects 14A-14C in the scene 12 can be greater than or less than that illustrated in FIG. 1.

In FIG. 1, the first object 14A is a subject 16 (e.g. a focal point) of the scene 12. Stated in another fashion, the recorder 10 is focused on the first object 14A. Further, the second objects 14B and the third objects 14C are located in the background. Alternatively, one of the second objects 14B or third objects 14C can be the focal point of the scene 12 or in the foreground.

The type of subject 16 represented in the scene 12 can vary. In one embodiment, the subject 16 is a human being (a sound source) that is speaking, e.g. generating audible sound that is recorded by the recorder 10 concurrently with an image (not shown in FIG. 1) of the human being. Alternatively, for example, the subject 16 can be another animal or object that generates audible sound.

The location of the subject 16 in the scene 12 relative to the recorder 10 can vary. For example, the subject 16 can be directly in front of the recorder 10 or to the left or right of the recorder 10. In FIG. 1, the subject 16 is located to the right of the recorder 10. Further, the subject 16 is located a separation distance SD away from the recorder 10.

It should be noted that in certain embodiments, the recorder 10 adjusts the audio reproduction of the recorded sounds based on the location of the subject 16 relative to the recorder 10. As a result thereof, the recorder 10 is able to better re-create for listeners the conditions that actually existed near the scene 12.

Figure 2A:
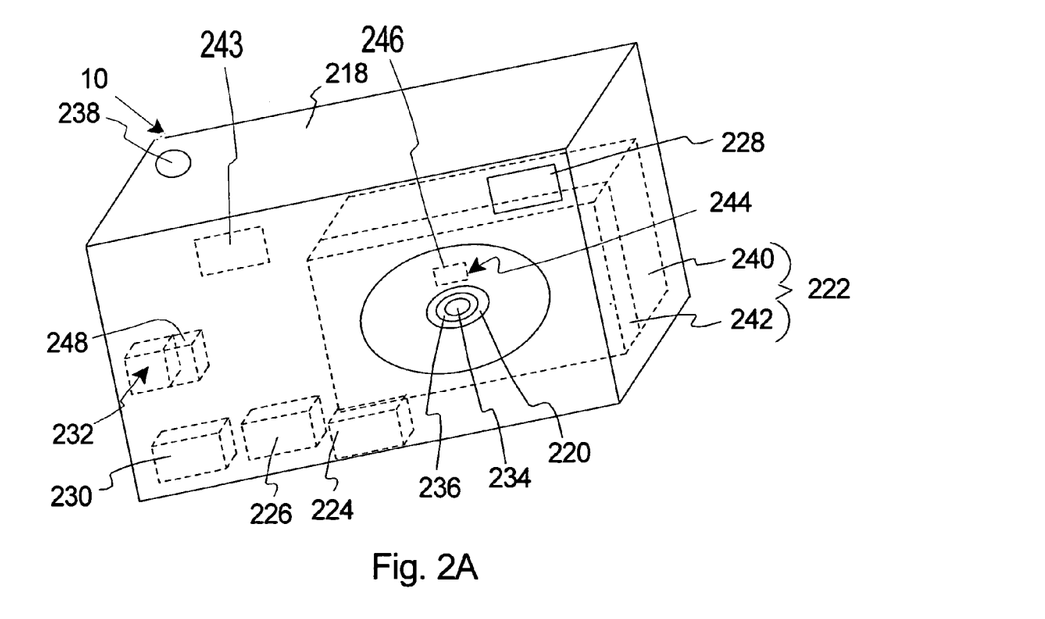
FIG. 2A is a simplified front perspective view of one embodiment of the recorder.

FIG. 2A illustrates a simplified, front perspective view of one, non-exclusive embodiment of the recorder 10. In this embodiment, the recorder 10 is a digital camera that can operate in a video mode. Alternatively, for example, the recorder 10 can be a camcorder, another type of video recorder, or another type of device that records sound.

In FIG. 2A, the recorder 10 includes an apparatus frame 218, an optical assembly 220, an image system 222 (illustrated as a box in phantom), an audio system 224, a power source 226 (illustrated as a box in phantom), an illumination system 228, a storage system 230 (illustrated as a box in phantom), and a control system 232 (illustrated as a box in phantom). The design of these components can be varied to suit the design requirements and type of recorder 10. Further, the recorder 10 could be designed without one or more of these components. For example, the recorder 10 could be designed without the illumination system 228.

The apparatus frame 218 can be rigid and support at least some of the other components of the recorder 10. In one embodiment, the apparatus frame 218 includes a generally rectangular shaped hollow body that forms a cavity that receives and retains the other components of the recorder 10. In FIG. 2A, the optical assembly 220, the image system 222, the audio system 224, the power source 226, the illumination system 228, the storage system 230, and the control system 232 are secured to the apparatus frame 218.

The apparatus frame 218 can include an aperture 234 and a shutter mechanism 236 that work together to control the amount of light that reaches the image system 222. The shutter mechanism 236 can include a pair of shutter shades (not shown) that work in conjunction with each other to allow the light to be focused on the image system 222 for a certain amount of time. The shutter shades are activated by a shutter button 238.

The optical assembly 220 focuses light onto the image system 222. The optical assembly 220 can include a single lens or a combination of lenses.

The image system 222 captures the captured image (not shown in FIG. 2A). The design of the image system 222 can vary according to the type of recorder 10. For a digital type camera, the image system 222 includes an image sensor 240 (illustrated in phantom), and a filter assembly 242 (illustrated in phantom).

The image sensor 240 receives the light that passes through the aperture 234 and converts the light into electricity. One non-exclusive example of an image sensor 240 for digital cameras is known as a charge coupled device ("CCD"). An alternative image sensor 240 that may be employed in digital cameras uses complementary metal oxide semiconductor ("CMOS") technology. CMOS devices use several transistors at each photosite to amplify and move the charge using more traditional wires.

The image sensor 240, by itself, produces a grayscale image as it only keeps track of the total intensity of the light that strikes the surface of the image sensor 240. Accordingly, in order to produce a full color image, the filter assembly 242 is necessary to capture the colors of the image.

When in the recorder 10 is in a video mode, the image system 222 sequentially captures a plurality of images every second. The number of images captured per second can vary. For example, the image system 222 can capture between approximately 10 and 120 images per second. However, the number of images can be greater or lesser than this amount.

It should be noted that other designs for the image system 222 can be utilized.

The audio system 224 receives the sound waves near the recorder 10. For example, the audio system 224 can record the sound from the sound source, e.g. the subject 16 (illustrated in FIG. 1). In one embodiment, the audio system 224 is a single microphone that converts sound waves into analog electrical signals. Subsequently, the electrical signals can be converted into digital data by the control system 230. Alternatively, the audio system 224 can include another type of sound wave receiver.

The power source 226 provides electrical power to the electrical components of the recorder 10. For example, the power source 226 can include one or more chemical batteries, either the one time use disposable batteries (such as alkaline, zinc-air), or the multiple use rechargeable batteries (such as nickel-cadmium, nickel-metal-hydride, lead-acid, lithium-ion).

The illumination system 228 provides a generated light beam (not shown), e.g. that can be used to selectively illuminate at least a portion of the scene 12 (illustrated in FIG. 1).

In one embodiment, the recorder 10 includes a position assembly 243 that determines the position of the subject 16 (illustrated in FIG. 1) relative to at least a portion of the recorder 10. Stated in another fashion, the position assembly 243 generates position information that relates to the position of the subject 16 relative to at least a portion of the recorder 10. The position assembly 243 can include hardware and software. For example, the position assembly 243 can be an autofocus assembly 244 that including one or more lens movers 246 (illustrated as a box in phantom) that move one or more lenses of the optical assembly 220 in or out until the sharpest possible image of the subject 16 is received by the image system 222. For example, the autofocus assembly 244 can be autofocus type assembly that utilizes an active or passive type system.

With either autofocus assembly 244, the control system 232 can determine the separation distance SD (illustrated in FIG. 1) between the optical assembly 220 and the subject of the scene 12. The position assembly 243 is discussed in more detail below.

The storage system 230 stores the various captured images and the recorded sound waves. Additionally, the storage system 230 can store an adjusted sound track. Further, the storage system 230 can store the corresponding position information from the focusing assembly 244.

In one embodiment, the captured images are stored on an image data track and the recorded sound waves and/or the adjusted sound track are stored on an audio data track. The storage system 230 can be fixedly or removably coupled to the apparatus frame 218. Non-exclusive examples of suitable storage systems 230 include flash memory, a floppy disk, a hard disk, magnetic tape, or a writeable CD or DVD.

The control system 232 is electrically connected to and controls the operation of the electrical components of the recorder 10. The control system 232 can include one or more processors and circuits and the control system 232 can be programmed to perform one or more of the functions described herein. In FIG. 2A, the control system 232 is positioned within the apparatus frame 218.

In one embodiment, the recorder 10 includes a compensation system 248 (illustrated as a box in phantom) that receives the recorded sounds from the audio system 224 and the position information regarding the position of the subject 16 relative to the recorder 10 to produce the adjusted sound track. Stated in another fashion, the compensation system 248 can selectively adjust the audio reproduction of the recorded sounds based on the location of the subject 16 (illustrated in FIG. 1) relative to the recorder 10. With this design, the recorder 10 is able to better re-create for listeners the conditions that actually existed near the scene 12.

In FIG. 2A, the compensation system 248 is a part of the control system 232. In this embodiment, the compensation system 248 includes an algorithm. Alternatively, as discussed below, the compensation system 248 can be separate from the recorder 10.

Figure 2B:
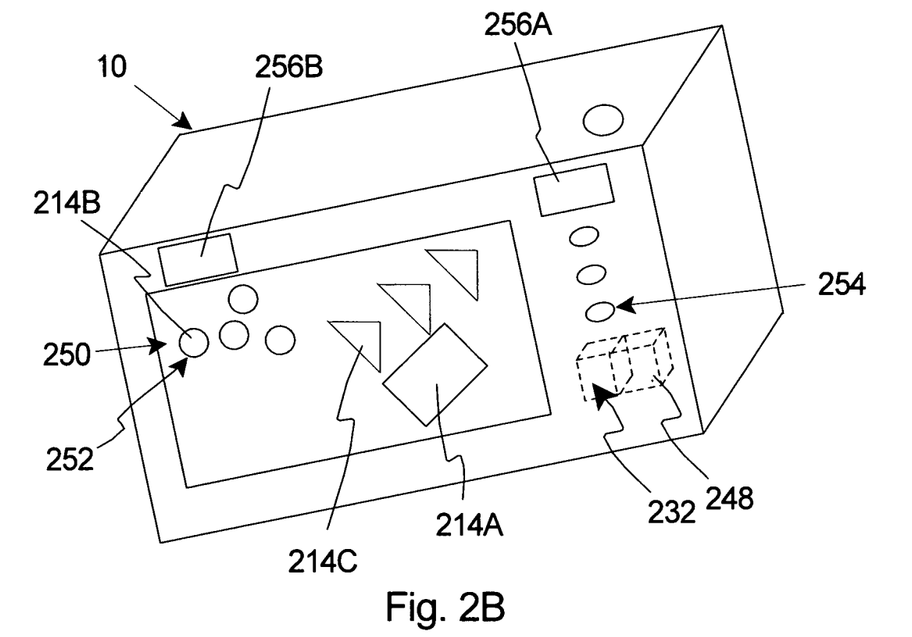
FIG. 2B is a simplified rear perspective view of the recorder of FIG. 2A.

Referring to FIG. 2B, additionally, the recorder 10 can include an image display 250 that displays the one or more captured images 252 (only one is illustrated in FIG. 2B) that were captured by the image system 222. With this design, the video of the scene can be replayed on the image display 250.

In FIG. 2B, the captured image 252 includes a captured first object 214A, a plurality of captured second objects 214B, and a plurality of captured third objects 214C. Further, the image display 250 can display other information such as the time of day, and the date.

Moreover, the recorder 10 can include one or more control switches 254 electrically connected to the control system 232 that allows the user to control the functions of the recorder 10. For example, one or more of the control switches 254 can be used to selectively switch the recorder 10 to video mode, or to manually focus the optical assembly 220 (illustrated in FIG. 2A). Additionally, one or more of the control switches 254 can be used to selectively switch the recorder 10 to a compensation mode in which the compensation system 248 disclosed herein is activated.

In yet another embodiment, one or more of the control switches 254 can be used to bracket and/or highlight one or more captured objects 214A, 214B, 214C in the captured image 252. Subsequently, the audio signal can be adjusted by the compensation system 248 based on the location of the bracketed or highlighted object 214A, 214B, 214C in the captured image 252.

Additionally, the recorder 10 can include two spaced apart speakers, e.g. a right speaker 256A, and a left speaker 256B that are electrically connected to the control system 232. With this design, the adjusted sound track generated by the compensation system 248 can be replayed on the recorder 10 in stereophonic sound.

Figure 3A:
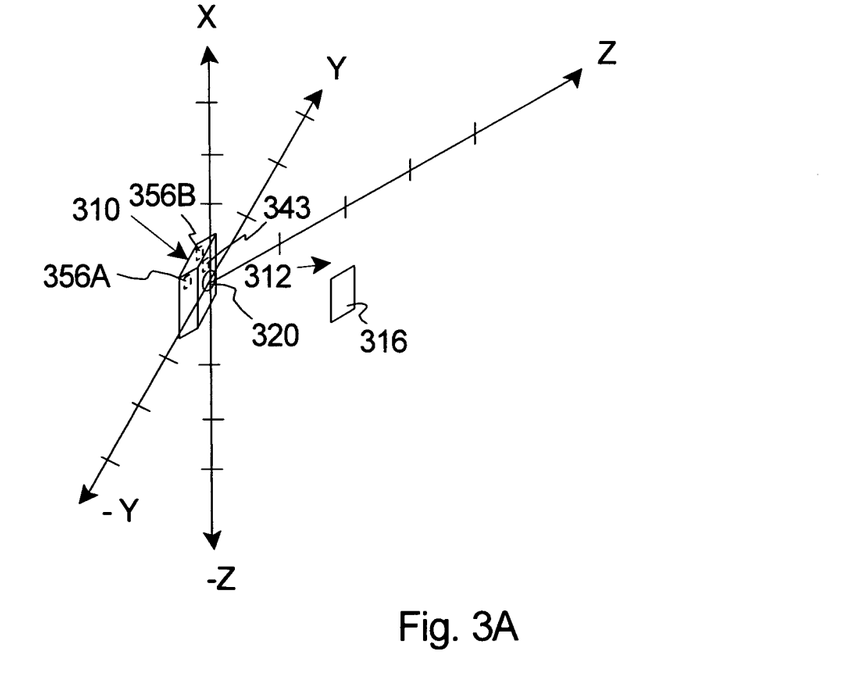
FIGS. 3A-3C are perspective views that illustrate the recorder and a subject of the scene with the subject at three alternate locations relative to the recorder.
Figure 3B:
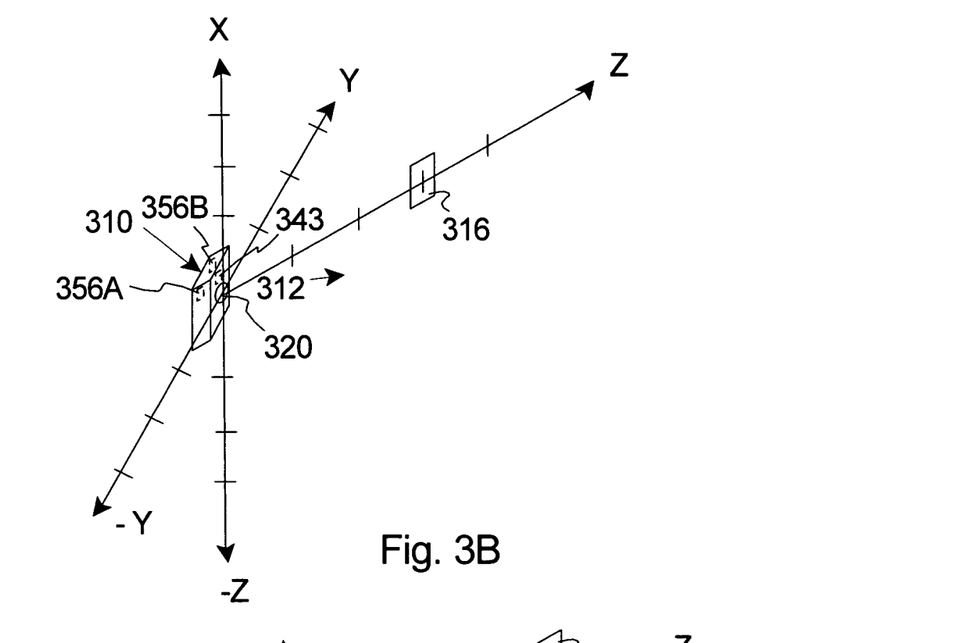
Figure 3C:
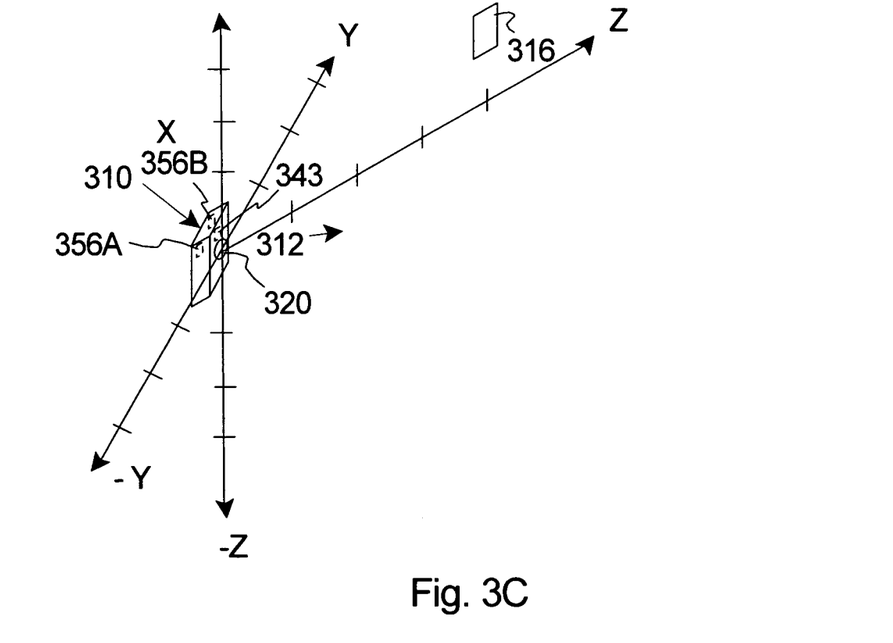

FIGS. 3A-3C are perspective illustrations of the recorder 310 and the subject 316 of the scene 312 with the subject 316 at three alternate locations relative to the recorder 310. FIGS. 3A-3C include an orientation system that illustrates an X axis, a Y axis that is orthogonal to the X axis and a Z axis that is orthogonal to the X and Y axes. It should be noted that these axes can also be referred to as the first, second and third axes. In these Figures, the orientation system is centered at the optical assembly 320 of the recorder 310.

In FIG. 3A, the subject 316 is to the right and below the recorder 310 and the subject 316 is relatively close to the recorder 310 approximately at orientation position −1Y, 2Z, −1X. In FIG. 3B, the subject 316 is directly in front of the recorder 310 and is subject 310 is slightly farther away from the recorder 310 at orientation position 0Y, 3Z, 0X. In FIG. 3C, the subject 316 is to the left and above the recorder 310 and the subject 310 has move even farther away from the recorder 310 at orientation position 1Y, 4Z, 1X. Thus, comparing FIGS. 3A-3C, the subject 316 has moved relative to the recorder 310.

FIGS. 3A-3C also illustrate that the recorder 310 includes the position assembly 343 that determines and monitors the position of the subject 316 relative to the recorder 310, e.g. the optical assembly 320 along at least one, two, or all three of the axes and provides position information regarding the position of the subject 316. For example, the position assembly 343 can utilize the autofocus assembly to determine the position of the subject 316 along the Z axis. In this example, the position of the subject 316 is equal to the focus depth of the optical assembly 320. Alternatively, or in conjunction with the autofocus assembly, the position assembly 343 can generate an infrared beam that bounces off the subject and comes back to a sensor. With this design, the position of the subject 316 along the Z axis can be determined.

The position of the subject 316 along the X axis and/or the Y axis can be determined by the position assembly 343 with some input from the user, or completely automatically with the position assembly 343.

Figure 3D:
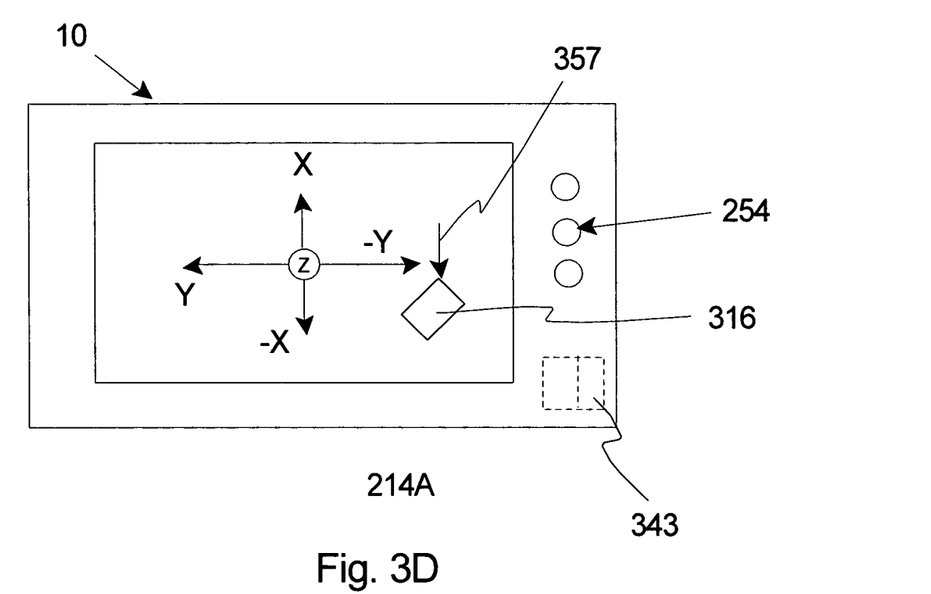
FIG. 3D is a simplified rear view of the recorder.

Referring to FIG. 3D that illustrates a rear view of the recorder 10, the user (not shown) can use one or more of the control switches 254 to manually select the captured image of the subject 316 on the image display 250. For example, the control switches 254 can control a curser 357 to highlight or otherwise identify the subject 316. Alternatively, the subject 316 can be identified in another fashion. In this embodiment, the subject 316 can be identified prior to, during or after the video is captured.

Once the captured image of the subject 316 is identified, the position assembly 343 can determine the position of the subject 316 along the X axis and the Y axis. Further, for a video, once selected, the position assembly 343 can track the position of the subject 316.

Additionally, the curser 357 can be used to identify more than one noise generating subject 316 from the scene 312 and the position assembly 343 can determine and monitor the relative position of multiple noise generating subjects 316 in the scene 312.

Alternatively, as provided above, the position of the subject 316 along the X axis and the Y axis can be determined completely automatically with the position assembly 343. For example, certain digital cameras sold by Nikon Corporation include software that is able to recognize and identify a face from the scene 312. In one embodiment, the position assembly 343 can include software that recognizes and identifies a face from the scene 312. Once the face is identified, the position assembly 343 can determine the position of the face along the X, Y, and Z axes. Additionally, or alternatively, the position assembly 343 can include software capable of identifying other objects from the scene 312. For example, the position assembly 343 can be designed to identify moving lips.

Further, if multiple noise producing objects exist in the scene 312, and these objects generate sound at different frequency profiles, the position assembly 343 can separate these and delay different frequency components from the left to right speaker at different rates to create the effect of a three dimensional sound field from multiple objects. However, this feature can require a very powerful processor and implementation of Fast Fourier Transform analysis of the sound, and the identification of the sound producing objects. This process can be aided by the knowledge that certain objects produce certain typical frequencies. For example, people talk at a frequency of approximately 3 KHz. Moreover, simple filters (common) filters could be used to filter out background sounds and noise.

Referring back to FIGS. 3A-3C, in one embodiment, the position assembly 343 can determine the relative position of the subject 316 in FIG. 3A is approximately −1Y, 2Z, −1X; the relative position of the subject 316 in FIG. 3B is approximately 0Y, 3Z, 0X; and the relative position of the subject 316 in FIG. 3C is approximately 1Y, 4Z, 1X.

Further, in this embodiment, the compensation system 248 (illustrated in FIG. 2A) utilizes the position information and the recorded sound to generate an adjusted sound track based on the position of the subject 316 relative to the recorder 310. The adjusted sound track can be stereophonic.

More specifically, the compensation system 248 correlates the position information and the sound to recreate a stereo sound. In certain embodiments, the subject 316 of the picture is also a localized sound source. Knowing the position of the subject 316 from the position assembly 343, a stereo sound track can be created with a slight phase delay from right to left (or left to right) of the stereo sound field. This causes the listener to identify the sound as coming from the approximate location of the focal point described by the X, Y, and Z information delivered from the position information.

This can further be explained with reference to FIG. 3A-3C. In these Figures, the right speaker 356A and the left speaker 356B are also illustrated. As provided above, with the position information of the subject 316 in FIGS. 3A-3C, is measured with the position assembly 343. In FIG. 3A, the subject 316 is to the right of the recorder 310. At this location, the compensation system 248 can provide the adjusted sound track so that the recorded sound is generated by the right speaker 356A slightly before the recorded sound is generated by the left speaker 356B. In FIG. 3B, the subject 316 is directly in front of the recorder 310. At this location, the compensation system 248 can provide the adjusted sound track so that the recorded sound is generated by the right speaker 356A and the left speaker 356B simultaneously. In FIG. 3C, the subject 316 is to the left of the recorder 310. At this location, the compensation system 248 can provide the adjusted sound track so that the recorded sound is generated by the left speaker 356B slightly before the recorded sound is generated by the right speaker 356A.

With this design, the recorder 310 adjusts the audio reproduction of the recorded sounds based on the location of the subject 316 relative to the recorder 310. Stated in another fashion, the compensation system 248 can be used to create a stereo sound field from a monaural sound recording, utilizing the position information. This permits the listener to have the feeling of hearing the focused subject move from one location to the next, when the focused subject is in motion, and generating sound. This also permits the viewer/listener to spatially locate the sounds source by listening to the reconstructed stereo sound. As a result thereof, the recorder 310 is able to better re-create for listeners the conditions that actually existed near the scene 312.

In one embodiment, for example, the position information along the X axis is optional for stereo graphic sound image construction, but could be used to reinforce intensity of the sound waves versus distance to the viewer.

Figure 4:
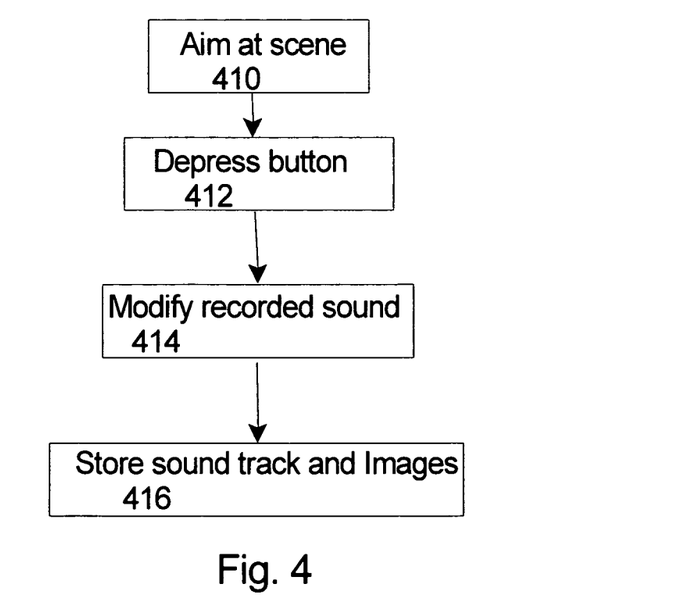
FIG. 4 is a simplified flow chart that further illustrates one embodiment of the present invention.

FIG. 4 is a simplified flow chart that further illustrates one non-exclusive example of the operation of the recorder. It should be noted that one or more of the steps can be omitted or the order of steps can be switched. First, the recorder is aimed toward the scene 410. Next, the user presses the shutter button to activate the image system to capture multiple the images, the position assembly to monitor the position of the subject, and the audio system to record the sounds from the scene 412. Subsequently, the compensation system modifies the recorded sound and creates the adjusted sound track based on the position of the subject 414. Next, the images and the adjusted sound track are stored in the storage device 416. The images and adjusted sound track can be played on the recorder or transferred to another device for subsequent playback.

Figure 5:
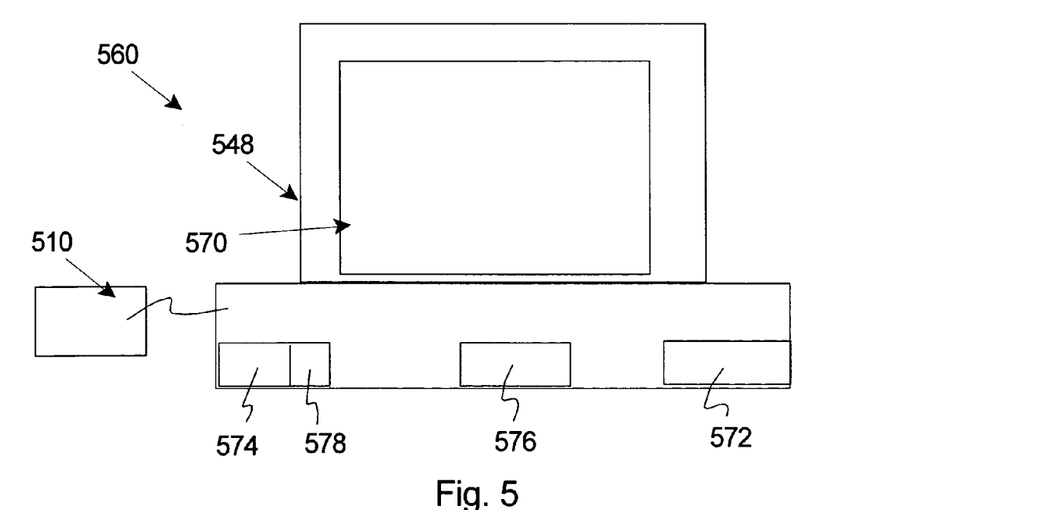
FIG. 5 is a simplified view of another embodiment of a system having features of the present invention.

FIG. 5 illustrates an assembly 560 having features of the present invention. In this embodiment, the recorder 510 again includes an image sensor (not shown in FIG. 5) that captures the images, a position assembly (not shown in FIG. 5) that generates position information of the subject (not shown in FIG. 5), and an audio system (not shown in FIG. 5) that captures the captured sound. However, in this embodiment, the compensation system 548 is not attached to the rest of the recorder 510. More specifically, in this embodiment, the compensation system 548 is a personal computer that includes a system display 570, a system storage device 572, a system processor 574, a system input device 576, and compensation software 578.

In this embodiment, the images, the corresponding position information and the corresponding captured sound can be transferred to the compensation 548 via an electrical connection, memory port, or docking port, for example. Subsequently, the compensation software 578 can utilize one or more algorithms to perform sound compensation described above.

In yet another embodiment, the system input device 576 can be used to bracket and/or highlight the subject of the captured images. Subsequently, the compensation software 578 can adjust the audio signal based on the location of the bracketed or highlighted subject.

Figure 6:
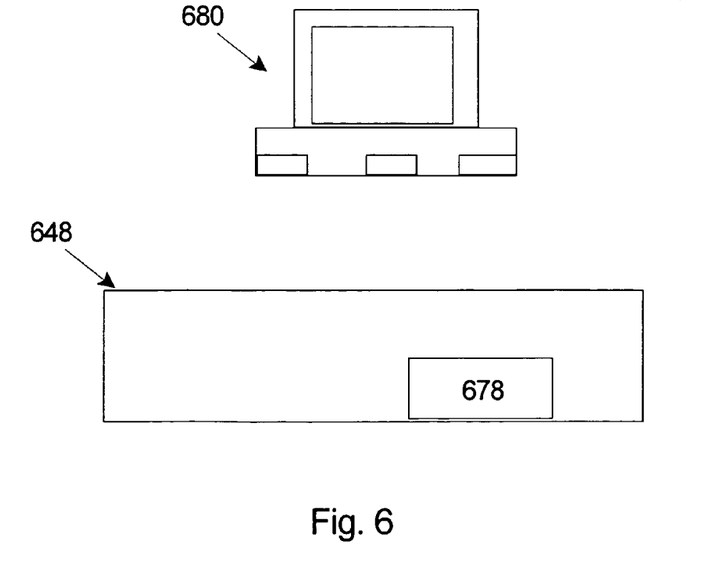
FIG. 6 is a simplified view of yet another embodiment of a system having features of the present invention.

FIG. 6 is a simplified illustration of yet another embodiment of a compensation system 648 having features of the present invention. In this embodiment, the compensation system 648 is again a computer system that contains the compensation software 678. However, in this embodiment, the compensation system 678 is remotely accessed by a personal computer 680 over the internet. With this design, the recorded sound and the positioning information can be transferred to the compensation system 648. Subsequently, the compensation system 648 can provide the adjusted sound track.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A recorder for recording a scene that includes a subject, the recorder comprising:
   an apparatus frame;
   an optical assembly secured to the apparatus frame, the optical assembly being adjustable to put a point in the scene in focus;
   an image system secured to the apparatus frame, the image system capturing an image of the scene;
   a position assembly that generates position information that relates to the position of the point in the scene relative to a portion of the recorder;
   an audio system secured to the apparatus frame, the audio system capturing a captured sound from the scene; and
   a compensation system that evaluates the position information and the captured sound from the scene and provides an adjusted sound track in view of the position information, wherein the compensation system evaluates the position information to determine the position of the point in the scene along at least two axes relative to the optical assembly and the compensation system provides the adjusted sound track based on the position of the point in the scene along the at least two axes.

2. The recorder of claim 1 wherein the compensation system evaluates the position information to determine the position of the point in the scene along three axes relative to the optical assembly and the compensation system provides the adjusted sound track based on the position of the point in the scene along the three axes.

3. The recorder of claim 1 wherein the adjusted sound track is stereophonic and the audio system captures the sound from the scene in a monaural fashion.

4. The recorder of claim 1 wherein the audio system includes a single microphone.

5. The recorder of claim 1 wherein the compensation system is secured to the apparatus frame.

6. The recorder of claim 1 wherein the at least two axes includes (i) a first axis, wherein the compensation system determining the position of the point in the scene along the first axis includes the compensation system determining whether the point in the scene is to the left of, substantially directly in front of, or to the right of the portion of the recorder; and (ii) a second axis, wherein the compensation system determining the position of the point in the scene along the second axis includes the compensation system determining whether the point in the scene is above, substantially directly in front of, or below the portion of the recorder.

7. The recorder of claim 1 wherein the audio system includes a microphone that captures the captured sound from the scene, and further comprising a right speaker and a left speaker, wherein the adjusted sound track includes the captured sound being replayed through each of the right speaker and the left speaker.

8. A method for recording a scene that includes a subject, the method comprising the steps of:
providing an apparatus frame;
adjusting an optical assembly to put a point in the scene in focus, the optical assembly being coupled to the apparatus frame;
determining the position of the point in the scene along at least two axes with a position assembly;
capturing a captured image of the scene with an image system, the image system being secured to the apparatus frame;
capturing sound from the scene with an audio system, the audio system being secured to the apparatus frame; and
providing an adjusted sound track based on the position of the point in the scene along the at least two axes with a compensation system.

9. The method of claim 8 wherein the step of providing an adjusted sound track includes the step of providing the adjusted sound track based on the position of the point in the scene along at least three axes.

10. The method of claim 8 wherein the step of providing an adjusted sound track includes the step of providing a stereophonic sound track from a monaural recording.

11. The method of claim 8 wherein the step of determining includes the steps of determining whether the point in the scene is to the left of, substantially directly in front of, or to the right of the optical assembly along a first axis with the position assembly; and determining whether the point in the scene is above, substantially directly in front of, or below the optical assembly along a second axis with the position assembly.

12. The method of claim 8 wherein the step of capturing includes the step of capturing the captured sound from the scene with a microphone of the audio system; and wherein the step of providing includes the step of replaying the captured sound through each of a right speaker and a left speaker.

13. A method for recording a scene that includes a noise generating object, the method comprising the steps of:
providing an apparatus frame;
capturing a captured image of the scene with an image system, the image system being secured to the apparatus frame;
capturing sound from the scene with an audio system, the audio system being secured to the apparatus frame;
manually selecting the noise generating object;
determining the position of the noise generating object along at least two axes with a position assembly; and
providing an adjusted sound track based on the position of the noise generating object along the at least two axes with a compensation system.

14. The method of claim 13 wherein the step of manually selecting occurs prior to the step of capturing a captured image.

15. The method of claim 13 wherein the step of manually selecting occurs during the step of capturing a captured image.

16. The method of claim 13 wherein the step of determining includes the steps of determining whether the noise generating object is to the left of, substantially directly in front of, or to the right of the optical assembly along a first axis with the position assembly; and determining whether the noise generating object is above, substantially directly in front of, or below the optical assembly along a second axis with the position assembly.

17. A recorder for recording a scene that includes a subject, the recorder comprising:
an apparatus frame;
an image system secured to the apparatus frame, the image system capturing an image of the scene;
an optical assembly secured to the apparatus frame, the optical assembly being adjustable until the sharpest possible image of the subject is received by the image system;
a position assembly that generates position information that relates to the adjustment of the optical assembly;
an audio system secured to the apparatus frame, the audio system capturing a captured sound from the scene; and
a compensation system that evaluates the position information and the captured sound from the scene and provides an adjusted sound track in view of the position information, wherein the compensation system evaluates the position information to estimate the position of the subject along at least two axes relative to the optical assembly and the compensation system provides the adjusted sound track based on the position of the subject along the at least two axes.

18. The recorder of claim 17 wherein the compensation system evaluates the position information to estimate the position of the subject along three axes relative to the optical assembly and the compensation system provides the adjusted sound track based on the position of the subject along the three axes.

19. The recorder of claim 17 wherein the at least two axes includes (i) a first axis, wherein the compensation system estimating the position of the subject along the first axis includes the compensation system estimating whether the subject is to the left of, substantially directly in front of, or to the right of the optical assembly; and (ii) a second axis, wherein the compensation system estimating the position of the subject along the second axis includes the compensation system estimating whether the subject is above, substantially directly in front of, or below the optical assembly.

20. The recorder of claim 17 wherein the audio system includes a microphone that captures the captured sound from the scene, and further comprising a right speaker and a left speaker, wherein the adjusted sound track includes the captured sound being replayed through each of the right speaker and the left speaker.

* * * * *